RUDOLPH STUCKWISCH.
Improvement in Brick Moulds.

No. 119,667.            Patented Oct. 3, 1871.

119,667

UNITED STATES PATENT OFFICE.

RUDOLPF STUCKWISCH, OF TERRE HAUTE, INDIANA.

IMPROVEMENT IN BRICK-MOLDS.

Specification forming part of Letters Patent No. 119,667, dated October 3, 1871.

*To all whom it may concern:*

Be it known that I, RUDOLPF STUCKWISCH, of Terre Haute, in the county of Vigo and State of Indiana, have invented certain new and useful Improvements in Brick-Molds; and I do hereby declare that the following is a full, clear, and exact description thereof, reference being had to the accompanying drawing and to the letters of reference marked thereon, which form a part of this specification.

The nature of my invention consists in the construction and arrangement of a cap for brick-molds, as will be hereinafter more fully set forth.

In order to enable others skilled in the art to which my invention appertains to make and use the same, I will now proceed to describe its construction and operation, referring to the annexed drawing, in which—

Figure 1:
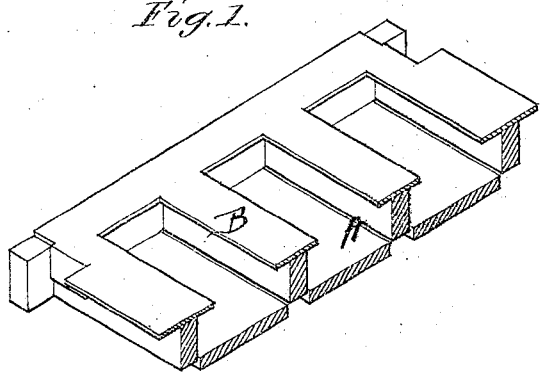
Figure 2:
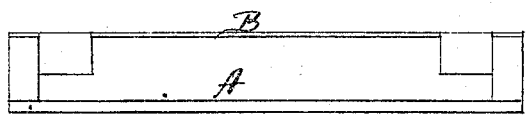

Figure 1 is a perspective view, and Fig. 2 a side view.

A represents a brick-mold of any suitable construction for brick-machines, and B is a metallic cap for the mold. This cap is made with openings a little smaller than the mold for the brick, so as to receive the clay without brushing off the sand on the inside, thereby causing the bricks to come out more easily.

The cap is placed on the mold before putting into the machine. On being filled and passing through, the cap is raised and drawn across the mold to cut off any extra clay that may remain, and smooths the brick down evenly. This arrangement saves time, and all the complicated machinery required in the slides of brick-machines.

There has always been more or less difficulty to get the slides in brick-machines to work properly, but this overcomes all this; is simple, durable, and of great use.

Having thus fully described my invention, what I claim as new, and desire to secure by Letters Patent, is—

The cap B, provided with openings, as described, said cap being detachable and arranged with relation to mold A for operation, in the manner and for the purpose set forth.

In testimony that I claim the foregoing as my own I affix my signature in presence of two witnesses.

RUDOLPF STUCKWISCH.

Witnesses:
  ANDREW GRIMES,
  B. F. ROYSE. (15)